United States Patent Office.

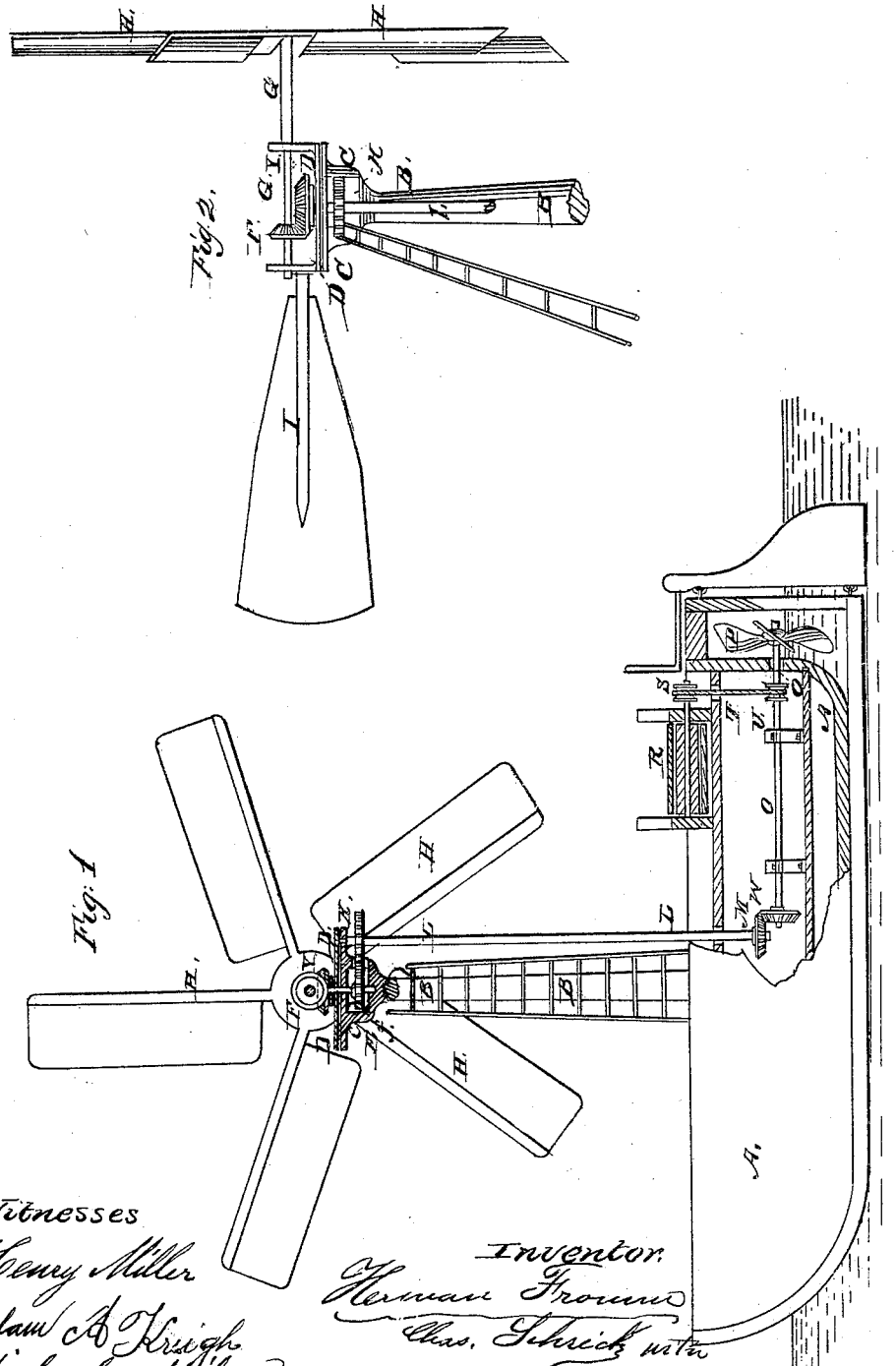

HERMAN FROMM, OF EAST NEW YORK, N. Y.

Letters Patent No. 65,370, dated June 4, 1867.

---

IMPROVED PROPELLER.

---

*The Schedule referred to in these Letters Patent and making part of the same.*

---

TO ALL WHOM IT MAY CONCERN:

Be it known that I, HERMAN FROMM, of East New York, in the county of Kings, and State of New York, have invented a new and useful Improvement in Propelling Vessels; and I do hereby declare the following to be a full, clear, and exact description of the nature thereof, sufficient to enable others skilled in the art to which it appertains to fully understand and use the same, reference being had to the accompanying drawings, making part of this specification, in which—

Figure 1 is a side view of a vessel with my improvement attached, parts being broken away to show the construction.

Figure 2 is a detail view of the same.

My invention has for its object to furnish an improved and economical means for propelling vessels through the water; and it consists in driving the propeller-shaft by a wind-wheel, and in the combination of a horse-power with the shaft of the propeller-screw, substantially as hereinafter more fully described.

A is the hull of the vessel, and B is mast, to the head of which is securely attached a cap, c, the top of which is a flat plate. D is a flat circular plate fitting upon the top of the cap c, to which it is pivoted by the short vertical rod E, which passes through it, and has a bevel gear-wheel, V, attached to its upper end, the teeth of which mesh into the teeth of the bevel gear-wheel F attached to the wind-wheel shaft G, which revolves in bearings attached to the upper side of the said disk D. To one end of the shaft G is attached an ordinary wind-wheel, H, as shown in figs. 1 and 2. To the side of the disk D is attached a vane, I, to keep the wheel H always towards the wind. To the shaft E is attached a gear-wheel, J, the teeth of which mesh into the teeth of the gear-wheel K attached to the vertical shaft. The upper end of the shaft revolves in bearings in the cap c, and to its lower end is attached a bevel gear-wheel, M, the teeth of which mesh into the teeth of the bevel gear-wheel W attached to the shaft O, the rear end of which projects through the stern of the vessel and has a propeller-screw, P, attached to it, as shown in fig. 1, so that the revolution of the wind-wheel H imparts motion to the screw P and propels the vessel. R is an ordinary horse-power, to the projecting end of the shaft of which is attached a pulley, S, which is connected to the propeller-shaft O by a band, T, passing around it and around the pulley U attached to the said shaft O, so that in case of the absence of wind the propeller-screw may be operated by horse-power.

Having thus described my invention, what I claim as new, and desire to secure by Letters Patent, is—

The combination of a windmill and an ordinary horse-power with the screw-shaft of a vessel, substantially as described for the purpose specified.

To the above I have signed my name this 17th day of April, 1867.

HERMAN FROMM.

Witnesses:
MICHAEL MILAN,
THOMAS G. HALL.